US009431864B2

(12) United States Patent
Rico et al.

(10) Patent No.: US 9,431,864 B2
(45) Date of Patent: *Aug. 30, 2016

(54) APPARATUS TO SUPPORT SUPERCONDUCTING WINDINGS IN A ROTOR OF AN ELECTROMOTIVE MACHINE

(71) Applicants: Raul Ricardo Rico, Oviedo, FL (US); Robert L. Murphy, Longwood, FL (US)

(72) Inventors: Raul Ricardo Rico, Oviedo, FL (US); Robert L. Murphy, Longwood, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 444 days.

This patent is subject to a terminal disclaimer.

(21) Appl. No.: 13/945,982

(22) Filed: Jul. 19, 2013

(65) Prior Publication Data
US 2013/0300239 A1  Nov. 14, 2013

Related U.S. Application Data

(63) Continuation-in-part of application No. 13/418,624, filed on Mar. 13, 2012, now Pat. No. 8,664,809.

(60) Provisional application No. 61/452,726, filed on Mar. 15, 2011, provisional application No. 61/683,829, filed on Aug. 16, 2012.

(51) Int. Cl.
| H02K 9/00 | (2006.01) |
| H02K 5/00 | (2006.01) |
| H02K 55/04 | (2006.01) |
| H02K 3/48 | (2006.01) |

(52) U.S. Cl.
CPC ............ *H02K 5/00* (2013.01); *H02K 55/04* (2013.01); *H02K 3/48* (2013.01); *Y02E 40/625* (2013.01)

(58) Field of Classification Search
CPC ....... H02K 5/00; H02K 55/04; Y02E 40/625
USPC ................... 310/52, 91, 260, 261.1
See application file for complete search history.

(56) References Cited

U.S. PATENT DOCUMENTS

| 5,548,168 A | 8/1996 | Laskaris et al. |
| 7,633,192 B2 | 12/2009 | Zhang et al. |
| 7,795,764 B2 | 9/2010 | Frank et al. |
| 7,825,551 B2 | 11/2010 | Zhang et al. |
| 8,664,809 B2 * | 3/2014 | Rico et al. ............. 310/52 |
| 2002/0171303 A1 | 11/2002 | Laskaris et al. |
| 2002/0171304 A1 | 11/2002 | Laskaris et al. |

(Continued)

FOREIGN PATENT DOCUMENTS

| JP | 08168235 A | 6/1996 |
| JP | 2003533957 A | 11/2003 |

(Continued)

*Primary Examiner* — Hanh Nguyen (57) ABSTRACT

An apparatus (structure) is provided to support a superconductor winding (61) of an electromotive machine. An assembly (110), such as a cradle, may define a recess to receive the superconductor winding. An elongated loop (74) provides radial support to the winding. Loop 74 may be made of a material resistant to heat flow, such as a fiber-reinforced polymer (FRP) material. Assembly (110) may be arranged to support elongated loop (74) at a distal end (78) of the loop. A base assembly (130) may be arranged to anchor the elongated loop at a proximate end (76) of the loop. A support structure 120 may be arranged to provide tangential load support to the assembly.

19 Claims, 10 Drawing Sheets

(56) References Cited

U.S. PATENT DOCUMENTS

| | | |
|---|---|---|
| 2002/0171318 A1 | 11/2002 | Wang et al. |
| 2002/0171325 A1 | 11/2002 | Wang et al. |
| 2002/0190586 A1 | 12/2002 | Laskaris et al. |
| 2003/0102770 A1 | 6/2003 | Laskaris |
| 2003/0173862 A1 | 9/2003 | Wang et al. |
| 2006/0293189 A1 | 12/2006 | Ries |
| 2008/0079323 A1* | 4/2008 | Zhang et al. .................. 310/52 |

FOREIGN PATENT DOCUMENTS

| | | |
|---|---|---|
| JP | 2010093886 A | 4/2010 |
| JP | 2011091892 A | 5/2011 |
| JP | 2011142773 A | 7/2011 |

* cited by examiner

APPARATUS TO SUPPORT SUPERCONDUCTING WINDINGS IN A ROTOR OF AN ELECTROMOTIVE MACHINE

This application claims benefit of the Aug. 16, 2012 filing date of U.S. provisional application 61/683,829. This application is a continuation-in-part of U.S. non-provisional application Ser. No. 13/418,624, filed Mar. 13, 2012, which in turn claimed benefit of the Mar. 15, 2011 filing date of U.S. provisional application 61/452,726, each of which is incorporated by reference herein.

FIELD OF INVENTION

The invention relates generally to electromotive machines, such as electric generators, motors, and, more particularly, to apparatus (e.g., mechanical structures) arranged to support and thermally isolate superconducting rotor windings in a rotor of the machine.

BACKGROUND OF THE INVENTION

To increase output and efficiency and reduce machine size and weight, superconducting rotor windings with virtually no electrical resistance have been developed. These winding are commonly referred to as high-temperature superconducting (HTS) windings (distinguished from low temperature superconducting materials that achieve a superconducting state at a lower temperature). It is preferred to use high-temperature superconducting materials since their cooling requirements are less severe.

Although the HTS rotor windings (coils) exhibit a relatively low resistance to electrical current flow, they are sensitive to mechanical bending and tensile stresses that can cause premature degradation and winding failure (e.g., an electrically open circuit). For example, it is necessary to form bends in the HTS rotor windings that circumscribe the core. Stresses are induced at these bends. Normal rotor torque, transient fault condition torques and transient magnetic fields induce additional stress forces in the rotor windings. Also, the HTS rotor winding may be subjected to over-speed forces during rotor balancing procedures and occasional over-speed conditions during power generation operation. These over-speed and fault conditions substantially increase force loads on the rotor windings beyond the loads experienced during normal operating conditions. These operating conditions must be considered in the design of the HTS rotor windings and associated support structures.

To maintain the superconducting conductors at or below their critical temperature, coolant flow paths carrying coolant supplied from a cryogenic cooler are disposed adjacent or proximate the windings. Typical coolants may comprise liquid helium, liquid nitrogen or liquid neon. Maintaining the structural integrity of the superconducting rotor windings and associated support structure against static and dynamic loads presents a substantial challenge to the development of a high temperature superconducting electromotive machine.

In view of the foregoing considerations, it is desirable the HTS rotor windings be adequately supported by a winding support system designed to withstand the forces, stresses, strains and cyclical loads of normal and fault condition operation described above. Moreover, the support system should ensure that the windings do not prematurely crack, fatigue or break. It is further desirable that the winding support structure appropriately thermally isolates the "warm" rotor (typically operating above room temperature) from the cryogenically-cooled HTS superconducting windings to maintain the windings at or below their critical temperature.

BRIEF DESCRIPTION OF THE DRAWINGS

The invention is explained in the following description in view of the drawings that show.

DETAILED DESCRIPTION OF THE INVENTION

Figure 1:
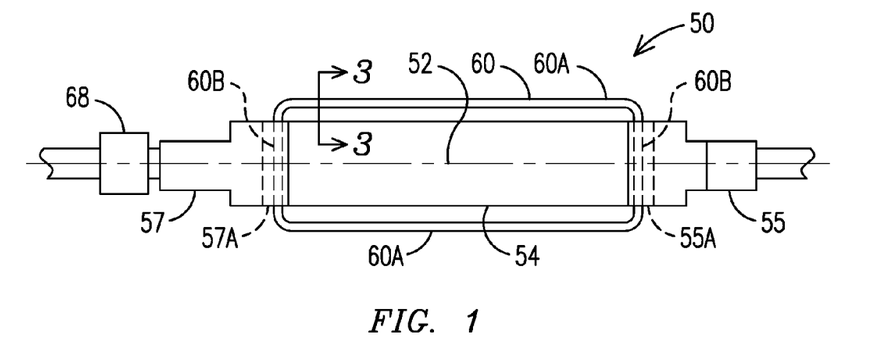
FIG. 1 is a schematic representation of an example rotor, as may be used in a superconducting electromotive machine embodying aspects of the present invention.

A superconducting rotor 50 embodying aspects of the invention is shown in FIG. 1. The superconducting rotor 50 defines a longitudinally-extending axis 52 (e.g., axial direction) and comprises a generally cylindrically-shaped core 54 and coaxially aligned rotor end sections 55 and 57 each attached to an end surface of the core 54. A material of the core 54 exhibits a high magnetic permeability, e.g. a ferromagnetic material such as iron.

In one example embodiment, the superconducting rotor 50 may further comprise a generally longitudinally-extending, racetrack-shaped superconducting coil or winding 60 comprising generally linear axially-extending winding segments 60A connected by radially-extending winding segments 60B (e.g., radial direction), as may extend through respective spacers 55A and 57A disposed at the respective end sections 55 and 57 of rotor 50. It will be appreciated that aspects of the present invention are not limited to racetrack-shaped winding configurations. It will be appreciated that other winding configurations may be employed, such as saddle-shaped configurations, and other configurations which may accommodate multiple windings.

In one example embodiment, superconducting rotor 50 may be arranged as a rotor of an electric generator and superconducting winding 60 may be arranged as an electric generator field (rotor) winding. One of the end sections 55 or 57 may include a turbine coupling for connecting rotor 50 to a prime mover for supplying rotational energy to the superconducting rotor 50 for generating electricity in a stator. In another embodiment, superconducting rotor 50 may be arranged as a rotor of a motor for producing rotational energy responsive to an electric field generated in a surrounding stator winding.

In one example embodiment, end section 57 may include a cryogenic transfer coupling 68. When superconducting rotor 50 is rotating during operation of the dynamoelectric machine, cryogenic transfer coupling 68, which may comprise a stationary portion and a rotating portion (the individual portions not illustrated in FIG. 1), supplies cooling fluid (e.g., cryogenic fluid) from a cryogenic cooler (not shown) to closed coolant flow paths or channels in the superconducting winding 60 to maintain the superconducting winding 60 at or below its critical temperature. The coolant flows through the coolant channels, circulates back to the cryogenic cooler where the coolant temperature is reduced and returns to the coolant channels.

The required cooling capacity of the cryogenic cooler is directly related to the heat transferred from the "warm" rotor core 54 and its surroundings to the superconducting winding 60 during operation of the superconducting generator. The inventors of the present invention propose a winding support structure arranged to substantially reduce such heat transfer during normal and transient operational conditions so that, for example, one can reduce the required cooler capacity and the energy consumed by the cooler to cool the cryogenic fluid.

Figure 2:
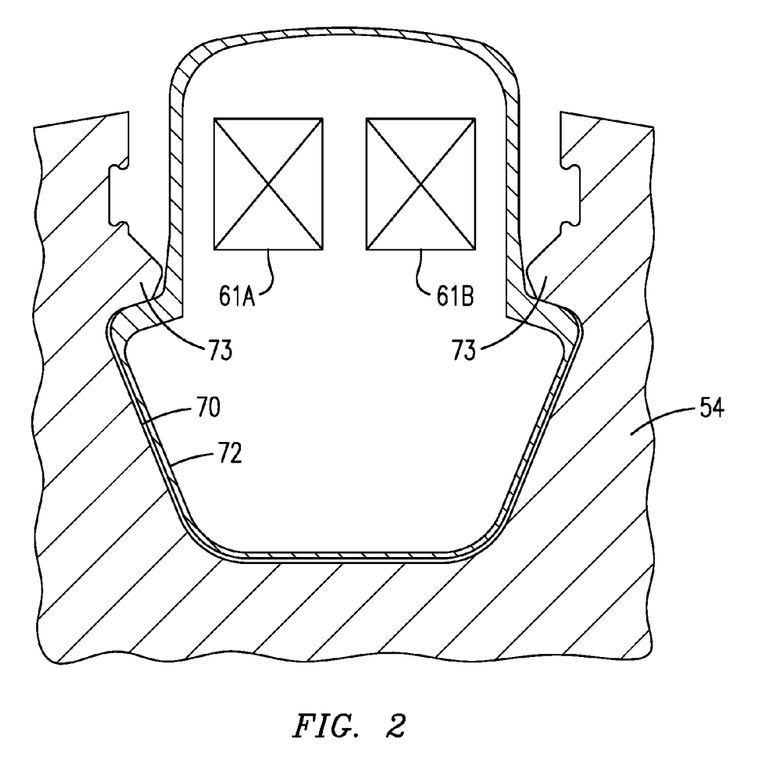
FIGS. 2-4 are respective cross-sectional views along a plane 3-3 of FIG. 1.
Figure 3:
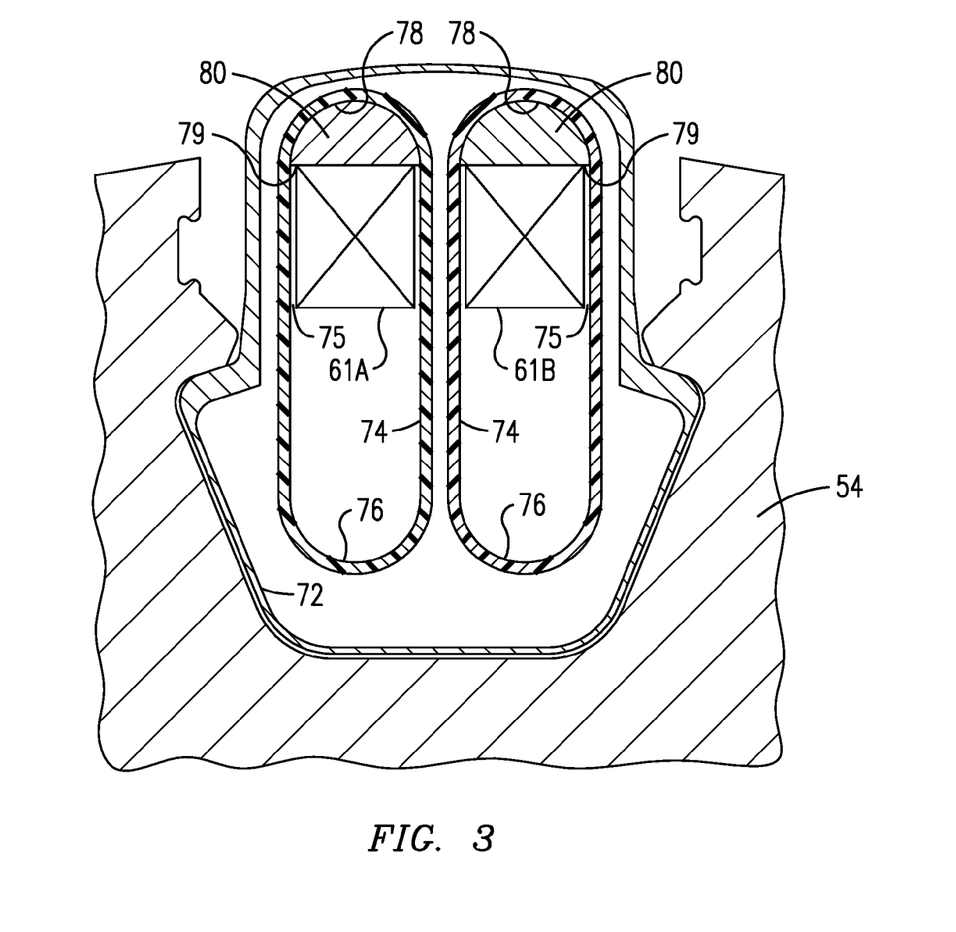
Figure 4:
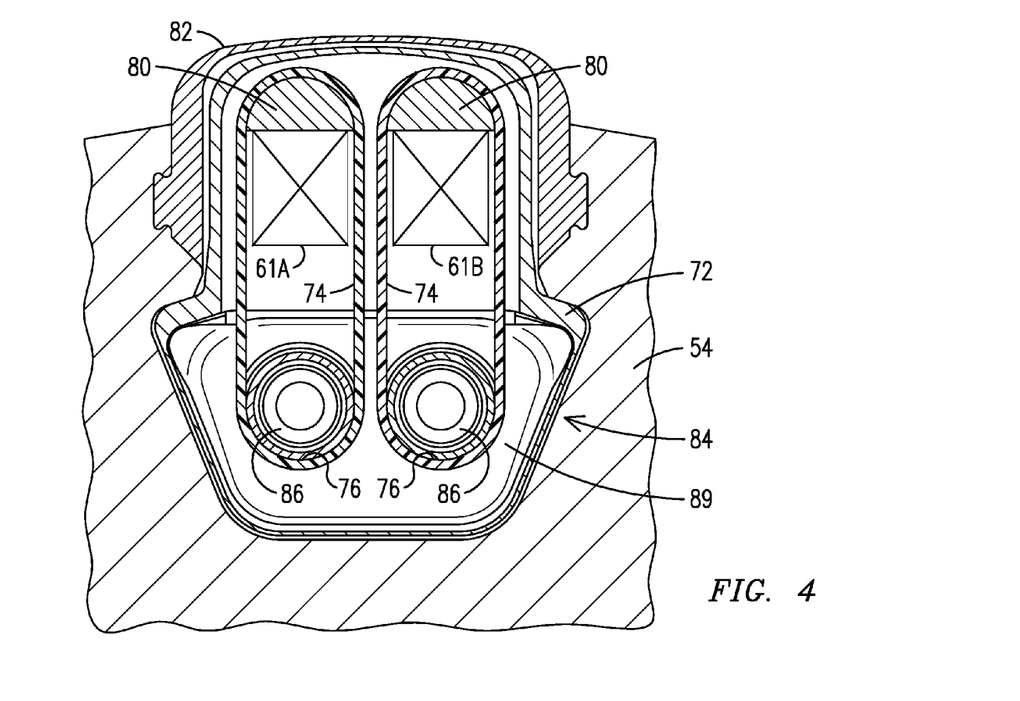

FIGS. 2-4 are respective cross-sectional views along a plane 3-3 of FIG. 1.

Because of the various components involved, these figures will be used for gradually introducing components of an example embodiment of a winding support apparatus embodying aspects of the present invention. The idea is to gradually introduce components that form the winding support apparatus to avoid overwhelming the reader.

FIG. 2 illustrates a cavity 70, as may be constructed in rotor core 54. Cavity 70 may be configured to receive a cryostat 72, as may be used to provide a vacuum to limit radiative heat transfer from rotor core 54 to superconducting blocks (e.g., windings) 61A and 61B, which in this example embodiment make up superconducting winding 60. In one example embodiment cryostat 72 may be made from a non-magnetic metal or metal alloy, such as non-magnetic steel.

Cavity 70 may be configured to define appropriately shaped restraining structures, such as shoulders 73, (e.g., protuberances) configured to engage a corresponding surface of cryostat 72 to retain cryostat 72 in cavity 70 under centrifugal forces that develop during rotor operation. Although two superconducting blocks are illustrated in the FIGs, it will be appreciated that aspects of the present invention are not limited to any specific number of superconducting blocks since other example embodiments may have more or fewer than two superconducting blocks.

Each of superconducting windings 61A and 61B may be made up of a plurality of superconducting tapes formed from a known superconducting HTS material. As would be understood by those skilled in the art, suitable adhesives and techniques may be used to assemble and retain the tapes in a desired configuration. The description below proceeds to introduce example components for mechanically supporting superconducting windings 61A and 61B while substantially reducing heat transfer to superconducting windings 61A and 61B from the "warm" rotor core 54.

FIG. 3 illustrates a pair of elongated loops 74, as may be formed from a material having a relatively high tensile strength at low-temperatures and having high thermal resistivity (e.g., a low thermal conductivity compared to the thermal conductivity of stainless steel), such as a fiber-reinforced polymer (FRP) material. Accordingly, FRP material is one example of a fiber-reinforced composite material substantially resistant to heat flow.

Each loop 74 extends from a proximate end 76 to a distal end 78 to provide radial support to superconducting windings 61A and 61B. In this example, distal end 78 constitutes a radially distal end relative to rotor axis 52 (FIG. 1). The FRP material of loops 74 substantially resists heat flow from the warm rotor core 54 to superconducting windings 61A and 61B. A gap 75 (e.g., radially-extending gap) may be provided between each loop 74 and a corresponding lateral surface of superconducting windings 61A and 61B to reduce conductive thermal coupling between loops 74 and superconducting windings 61A and 61B. Contact may be provided between loops 74 and superconducting windings 61A and 61B at a distal edge 79 (e.g., upper lateral edge) of superconducting windings 61A and 61B.

As should be appreciated from the description that follows, each loop 74 may be arranged to effectively transfer centrifugal loads exerted on superconducting windings 61A and 61B to the rotor core 54. FIG. 3 further shows an example embodiment of a pair of supports 80 (e.g., arch-shaped supports) each respectively disposed between a respective distal end 78 of loops 74 and a corresponding surface (e.g., top surface) of superconducting windings 61A and 61B. Arch-shaped supports 80 may be made from aluminum, aluminum alloy, or other suitable relatively light-weight fiber-reinforced composite material. The description below proceeds to introduce further components for mechanically supporting superconducting windings 61A and 61B while substantially reducing heat transfer to superconducting windings 61A and 61B from the "warm" rotor core 54.

FIG. 4 shows a base assembly 84 comprising a plurality of base modules 89 (e.g., FIGS. 6-8) configured to anchor with respect to the rotor core each loop 74 at its respective proximate end 76. In one example embodiment, base modules 89 may be arranged to form an axially-extending anchoring beam, and such modules may be conceptually analogized to Lego-like interlocking building blocks. It will be appreciated that the modular aspects of base assembly 84 are conducive to facilitate the routing of the axially-extending winding segments 60A (FIG. 1) of superconducting windings 61A and 61B.

Base assembly 84 may be made from any of various materials, such as steel, aluminum, aluminum alloy, fiber-reinforced composite material and may be configured to be enclosed by cryostat 72, where base assembly 84 is retained by shoulders 73 (FIG. 2) together with cryostat 72 in cavity 70 under centrifugal forces that develop during rotor operation. In one example embodiment, cryostat 72 may in part be configured to enclose base assembly 84 and may be further configured to extend outside cavity 70 to form a vacuum about the winding support apparatus and the superconductor windings.

In one example embodiment, base assembly 84 may include a tubular coupling 86 configured to receive a respective proximate end 76 of each loop 74 and to provide a mechanical connection (e.g., axial connection) to an adjacent base module. FIG. 4 further illustrates an electromagnetic shield 82, which may be connected to rotor 54 to shield superconducting windings 61A and 61B from transient electromagnetic fields. Shield 82 may be made from an electrically conductive and non-magnetic material, such as aluminum or copper.

Figure 5:
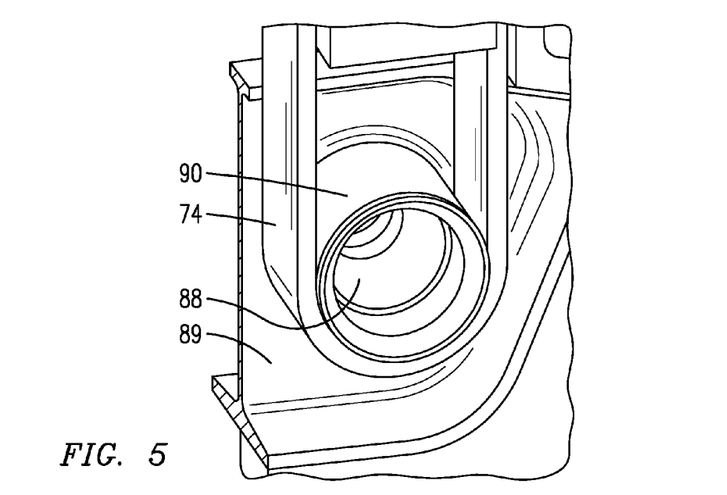
FIG. 5 is a fragmentary isometric view of an example base module, which in combination with additional base modules may be arranged to form an axially-extending anchoring beam, which in one example embodiment may be interconnected by way of a segmented tubular coupling arrangement.

FIG. 5 is a fragmentary isometric view of an example base module 89, which in combination with additional base modules, may form base assembly 84 (FIG. 4). In one example embodiment, each base module 89 may include a male coupler 88 configured to receive at least a portion of a female coupler 90, which over a portion of its outer diameter receives the proximate end of a corresponding loop 74. The axial dimension of female coupler 90 may be sufficiently long relative to the axial dimension of male coupler 88 so that female coupler can also be received by a male coupler of an axially adjacent base module.

Figure 6:
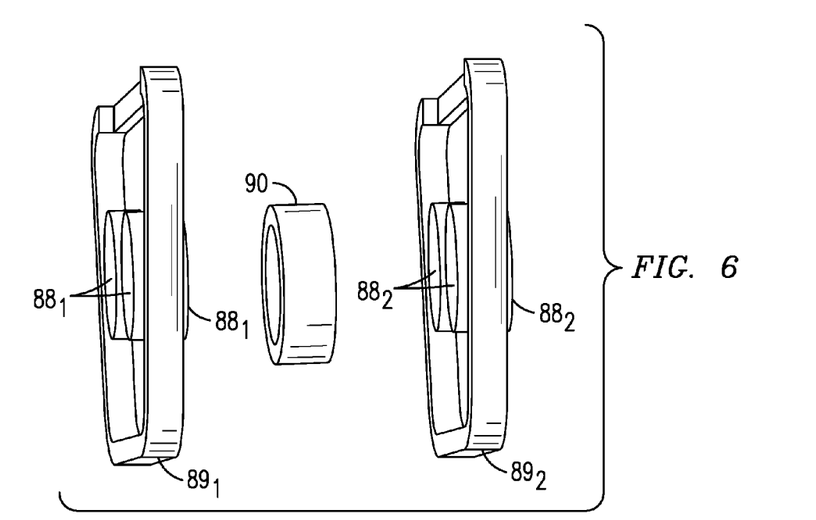
FIG. 6 is a fragmentary exploded view of two base modules, as may be axially interconnected to one another by way of tubular couplers.

FIG. 6 is a fragmentary exploded view of two base modules $89_1$ and $89_2$ each having respective male couplers $88_1$ and $88_2$ as may be axially interconnected to one another by way of respective female couplers 90. For simplicity of illustration just one female coupler 90 is shown in FIG. 6. An additional female coupler 90 would be used to interconnect the remaining male couplers of base modules $89_1$ and $89_2$.

Figures 7, 8:
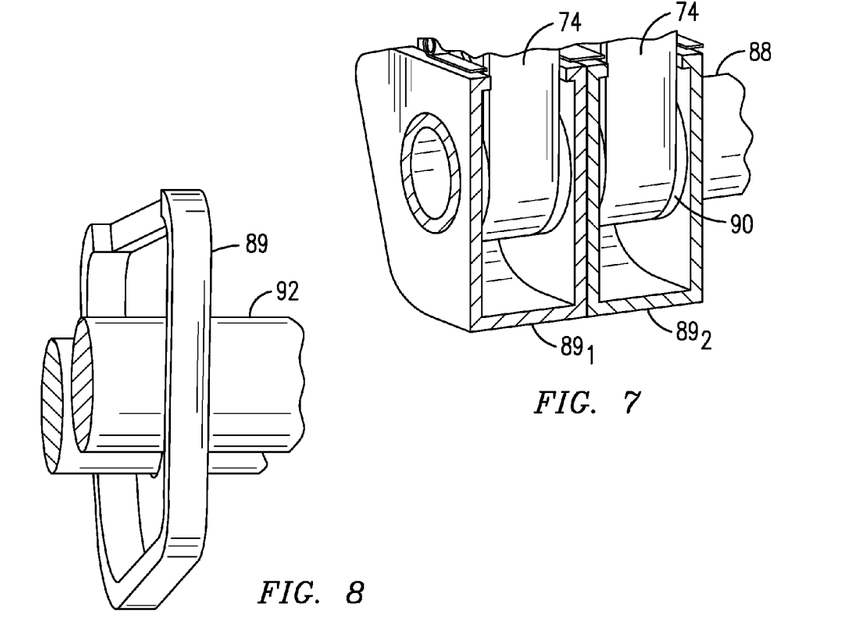
FIG. 7 is a fragmentary cut-away view illustrating an example axial assembly of two interconnected base modules including respective loops arranged to provide radial support.
FIG. 8 is an isometric view of continuous rods, as may be used for anchoring each loop at its respective proximate end, in lieu of the foregoing segmented coupling arrangement.

FIG. 7 is a fragmentary cut-away view illustrating an axial assembly of two example base modules $89_1$ and $89_2$ including respective elongated loops 74. It will be appreciated that the tubular coupling described in the context of FIGS. 3-7 is an example of a segmented tubular coupling arrangement. It will be understood that aspects of the present invention are not limited to a segmented tubular coupling arrangement. For example, one could use a continuous tubular coupling arrangement. For example, as shown in FIG. 8, one or more continuous rods 92 may be used for anchoring each loop 74 at its respective proximate end 76 in lieu of the foregoing segmented coupling arrangement.

Figure 9:
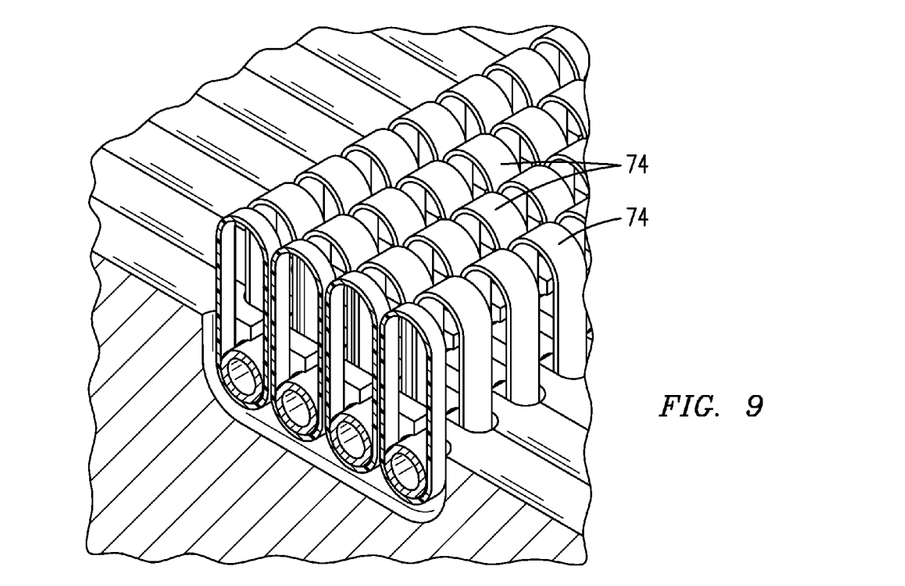
FIGS. 9 and 10 illustrate respective isometric views of an example embodiment of a base assembly where the loop-anchoring structures are integral with the rotor core of the machine.
Figure 10:
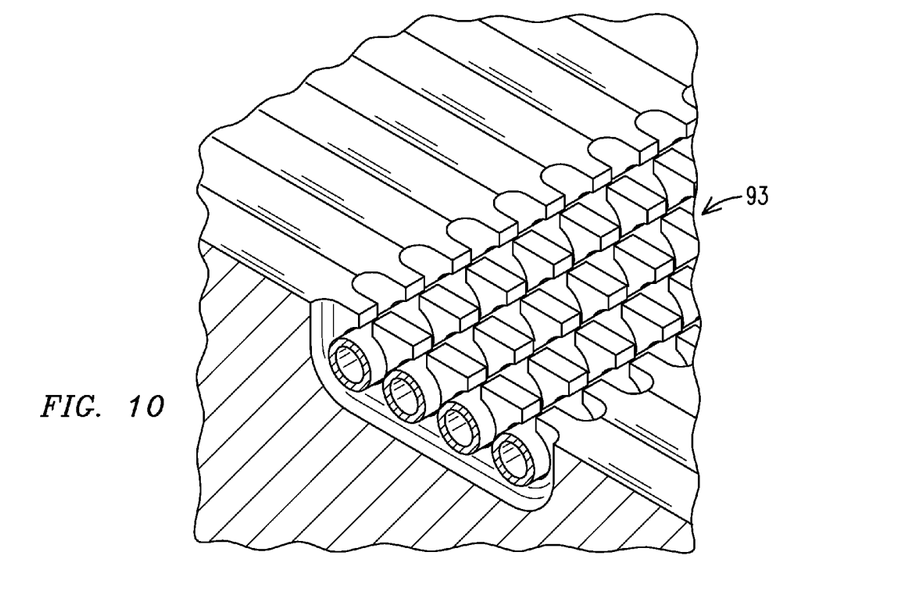

It will be appreciated that aspects of the present invention are not limited to a base assembly structure 84 disposed in a cryostat in a rotor cavity. For example, it is contemplated that, in lieu of base assembly 84 (and associated tubular coupling structures) accommodated in a rotor cavity, one could construct anchoring structures 93 for loops 74, where such anchoring structures are integral with the rotor core of the machine, as shown in FIGS. 9 and 10. In this example embodiment, the cryostat may be externally disposed relative to the rotor core, which is a cylindrical structure, and may be attached to and arranged to surround the rotor core 54 to form the vacuum about the winding support apparatus and the superconductor windings.

Figure 11:
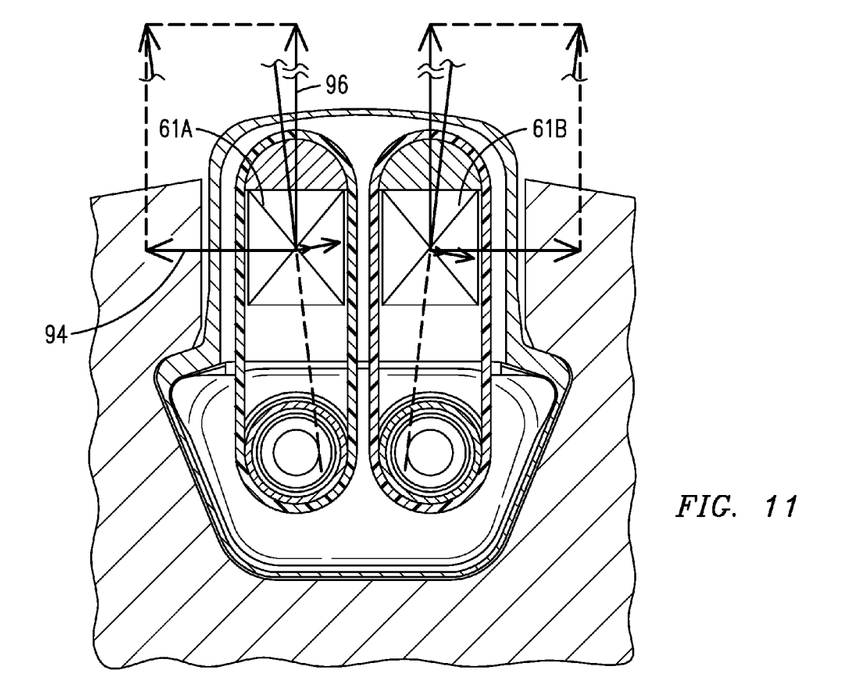
FIG. 11 is a diagram that may be helpful to visualize centrifugal forces, which may generate both a tangential load component (e.g., lateral component) and a radial load component, which, for example during rotor operation, may be experienced by the superconducting blocks (e.g., windings) of the machine.

FIG. 11 is used to visually appreciate that the positioning of superconducting windings 61A and 61B may not be coincidental with a radial direction. Therefore, during rotor operation, the centrifugal forces can generate both a tangential load component 94 (e.g., lateral component) and a radial load component 96, which will be experienced by superconducting windings 61A and 61B. The description below proceeds to introduce components used for mechanically supporting superconducting windings 61A and 61B in view of the presence of such tangential and radial load components.

Figure 12:
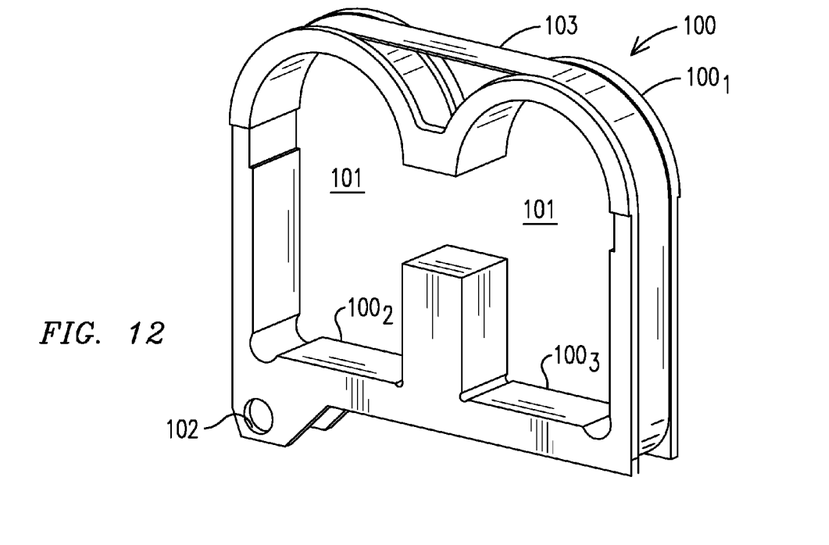
FIG. 12 is an isometric view of a bracket assembly that defines respective interior recesses configured to receive at least a portion of laterally-adjacent superconducting windings.
Figure 13:
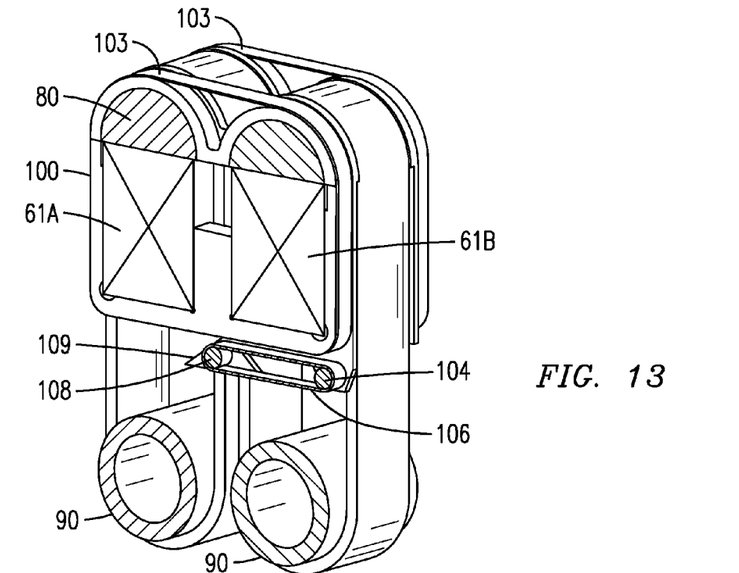
FIG. 13 is an isometric view of the bracket assembly of FIG. 12, showing the superconducting windings and respective arch-shaped supports. The bracket assembly may be arranged to support one end of a laterally-extending loop arranged to transfer lateral loads, which may be experienced by the superconducting windings.

FIG. 12 is an isometric view of a bracket assembly 100 that defines respective interior recesses 101 configured to receive at least a portion of superconducting windings 61A and 61B (e.g., laterally-adjacent windings) and respective arch-shaped supports 80, as illustrated in FIG. 13. In one example embodiment, bracket assembly 100 may be made up of three subassemblies, such as bracket subassemblies $100_1$, $100_2$, and $100_3$.

In this example embodiment, subassembly $100_1$ may be shaped as an inverted number "3" structure, and subassemblies $100_2$, and $100_3$ may be shaped as mutually facing "L" shaped structures. Respective portions of the periphery of subassemblies $100_1$, $100_2$, and $100_3$ may be strapped by a strap 103, such as may be made of titanium or other metal of high-tensile strength. In one example embodiment, strap 103 may be effectively arranged to keep subassemblies $100_1$, $100_2$, and $100_3$ tightly interconnected to one another and prevent separation of such subassemblies (e.g., opening separation of subassemblies $100_2$, and $100_3$) under a tangential load.

Bracket subassemblies $100_2$ or $100_3$ may include respective openings 102 for receiving a first pin 104 (FIG. 13) arranged to support one end of a laterally-extending loop 106, which (like radial-support loop 74) may also be made of a material substantially resistant to heat flow (e.g., FRP material and the like). The other end of laterally-extending loop 106 may be supported by a second pin 108, as may be connected to a central portion 109 of a respective base module. That is, pin 108 in combination with portion 109 of the base assembly comprises an anchor point for transferring to rotor core 54 through laterally-extending loop 106 lateral loads experienced by superconducting windings 61A and 61B.

Figure 14:
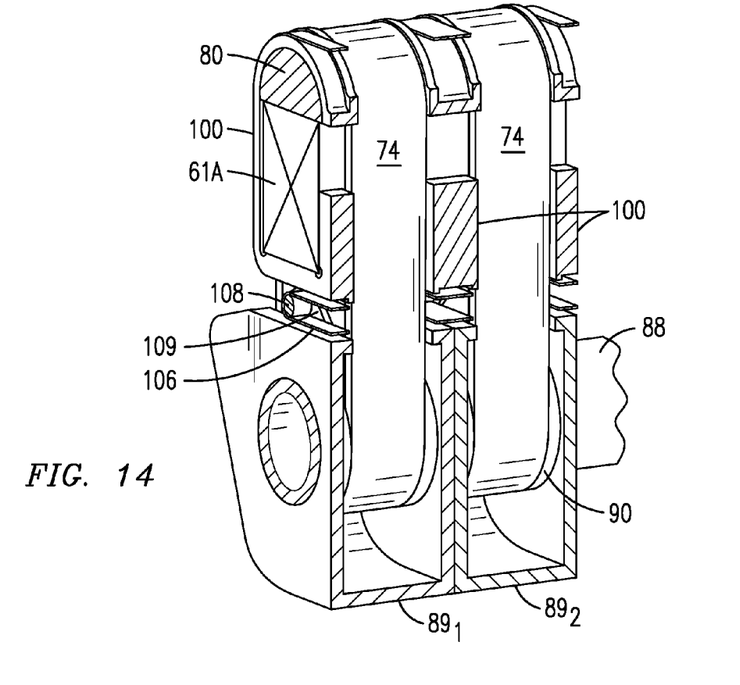
FIG. 14 is a fragmentary cut-away view illustrating an axial assembly of two example base modules including respective bracket assemblies that in combination make up a modular bracket assembly with respect to the axially-extending winding segments.

FIG. 14 is a fragmentary cut-away view illustrating an axial assembly of two example base modules $89_1$ and $89_2$ including respective bracket assemblies 100 that in combination make up a modular bracket assembly with respect to the axially-extending winding segments 60A (FIG. 1). As should be appreciated from FIG. 15, to provide symmetrical transfer to the lateral loads, in one example embodiment, the orientation of laterally-extending loops 106 may be alternated. For example, in FIG. 13, it can be appreciated that pin 104 is located relative to the right side of anchor pin 108, whereas in FIG. 15 it can be appreciated that pin 104 in the next axially-adjacent bracket assembly is located relative to the left side of anchor pin 108.

Figure 15:
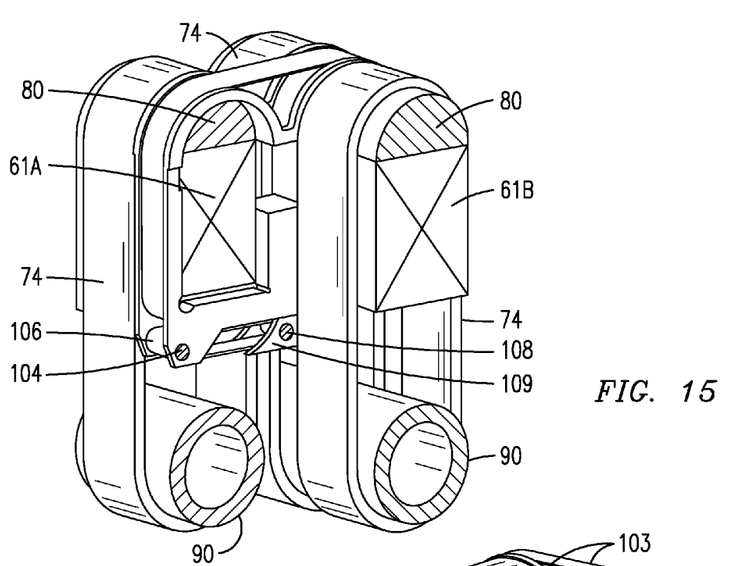
FIG. 15 is a fragmentary isometric view, which may be helpful to visualize that the orientation of the laterally-extending loops may be alternated to effect a symmetrical transfer to the lateral loads.

Accordingly, in one example embodiment, laterally-extending loops 106 may form an axial sequence of laterally-extending loops arranged to directionally alternate so that a first laterally-extending loop (e.g., lateral loop 106 in FIG. 13) in the sequence has its first end mechanically supported by a corresponding bracket assembly at a first lateral end (e.g., as shown in FIG. 13, loop 106 may be supported by pin 104, which in this example case is located relative to the right side of anchor pin 108) of the assembly. A second axially-adjacent laterally-extending loop (e.g., lateral loop 106 in FIG. 15) in the sequence may have its first end mechanically supported by a corresponding bracket assembly at a second lateral end of the assembly, (e.g., as shown in FIG. 15, loop 106 may be supported by pin 104, which in this case is located relative to the left side of anchor pin 108). In this example embodiment, the first and second ends of the corresponding assemblies may correspond to mutually opposite lateral ends, and thus the directionally alternating sequence of laterally-extending loops may be effectively arranged along the axial direction to symmetrically transfer a tangential load to the rotor core.

It will be appreciated that aspects of the present invention are not limited to a directionally alternating sequence of laterally-extending loops in order to symmetrically transfer a tangential load to the rotor core. For example, one may arrange laterally-adjacent (side-by-side) pairs of laterally-extending loops so that the respective first ends of such loops may be respectively connected to the mutually opposite lateral ends of a given bracket assembly and the respective second ends of such loops may be anchored (e.g., jointly anchored) to the central portion 109 of a respective base module.

It may be appreciated in FIG. 14 that bracket assembly 100 (e.g., the intermediate bracket assembly 100, which is shared by base modules 89$_1$ and 89$_2$) may be interposed between corresponding portions of respective pairs of axially-adjacent elongated loops 74.

Figure 16:
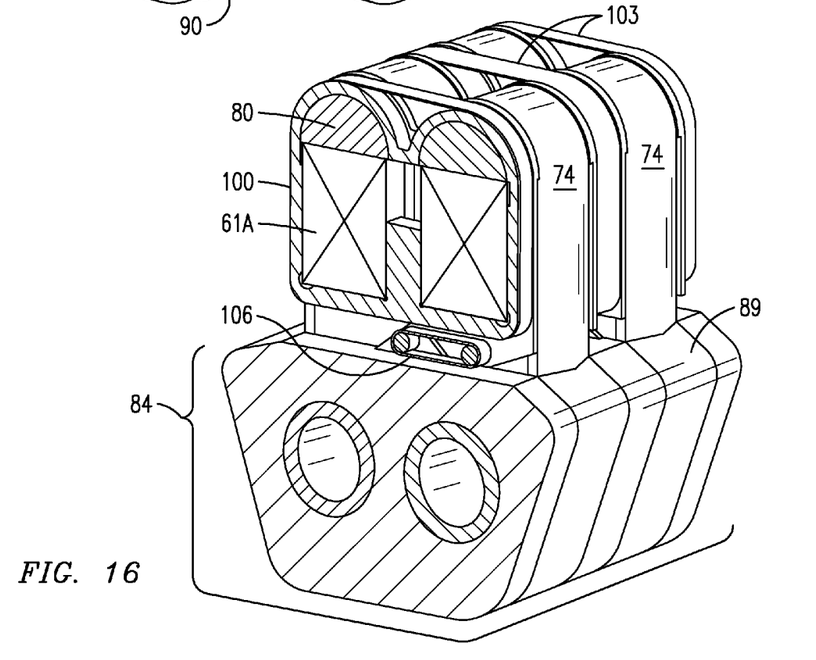
FIG. 16 is an isometric view illustrating an assembly of at least some of the various components illustrated in some of the preceding FIGs, which in combination form a winding support apparatus embodying aspects of the present invention, such as may be effective to substantially reduce heat transfer from the "warm" rotor core to the superconducting windings while mechanically withstanding forces, stresses, strains and cyclical loads that may develop during normal and/or fault conditions of the machine.

FIG. 16 is an isometric view illustrating an assembly of at least some of the various components described in the preceding description, which in combination form a winding support apparatus embodying aspects of the present invention, such as may be effective to substantially reduce heat transfer from the "warm" rotor core to the superconducting winding while mechanically withstanding forces, stresses, strains and cyclical loads that may develop during normal and/or fault conditions of the machine.

Figure 17:
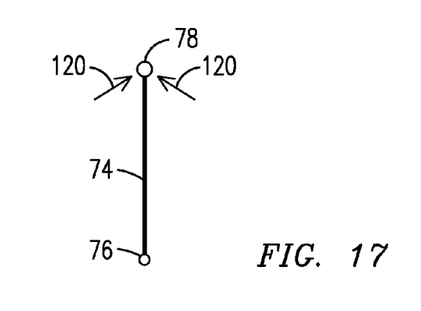
FIG. 17 is a simplified free-body diagram for conceptualizing load-carrying aspects regarding another example embodiment of the present invention, where a single elongated loop in combination with appropriate support structure may allow supporting the radial and tangential loads.

Although the description thus far has referred to one or more elongated loops 74 in combination with laterally-extending loops 106 to carry centrifugal and tangential loads, it is contemplated that aspects of the present invention could be implemented by way of one or more elongated loops 74 and appropriate support structure (other than (and/or in combination with) laterally-extending loops 106), conceptually represented by arrows 120 (FIG. 17), arranged to jointly carry such centrifugal and tangential loads.

Figure 18:
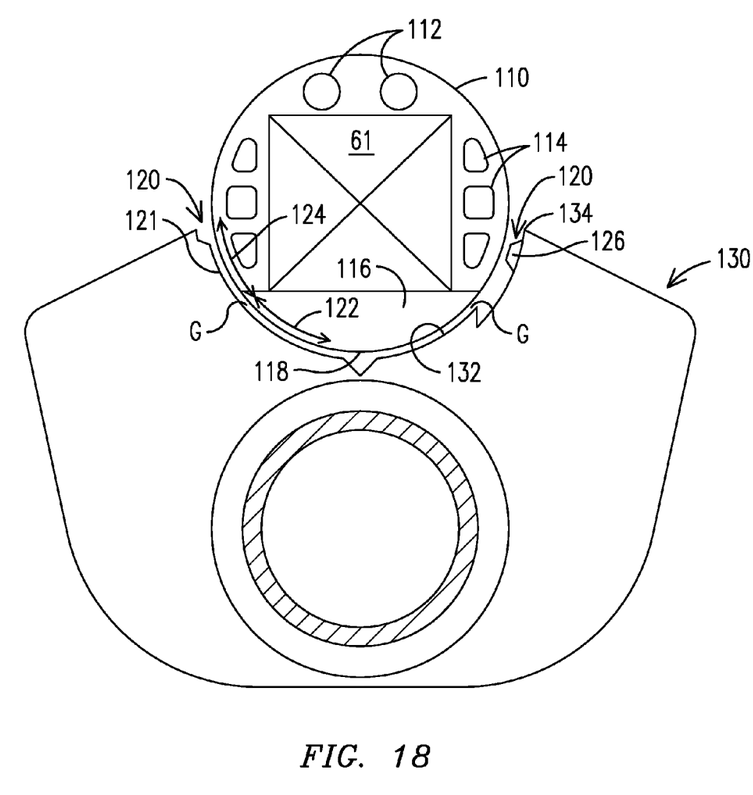
FIG. 18 is an elevational view illustrating an example base assembly adapted to include appropriate support structure which may be used in conjunction with a single elongated loop to carry the radial and tangential loads.
Figure 19:
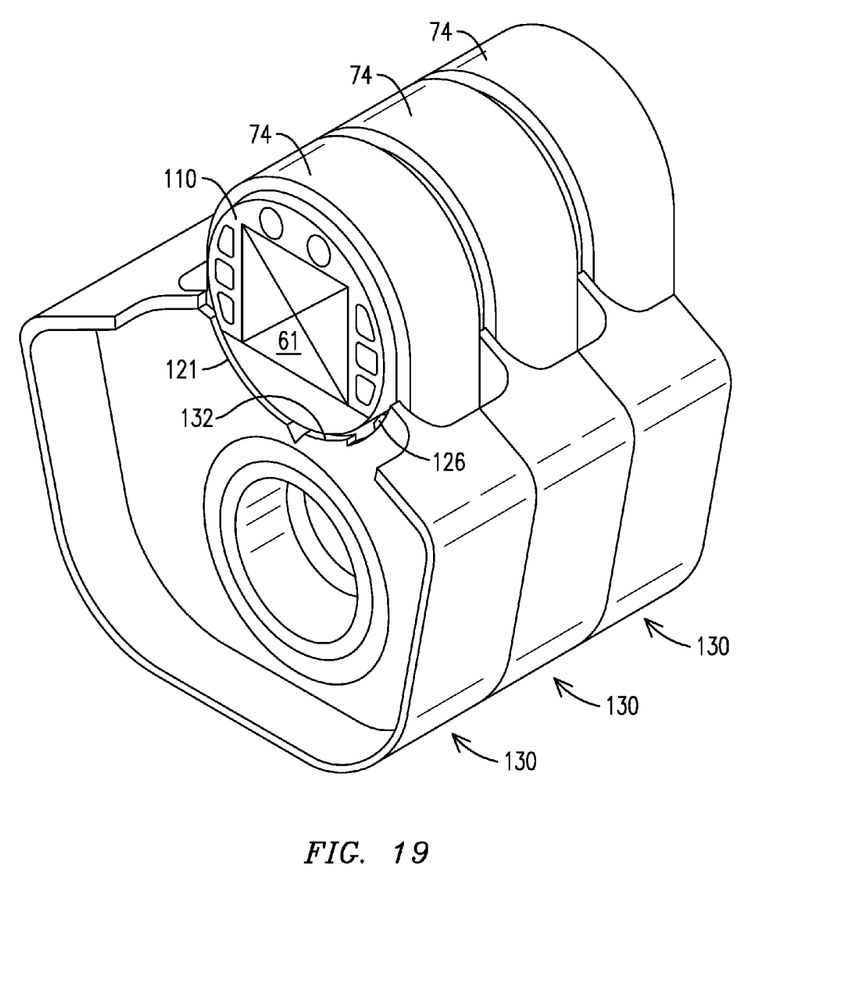
FIG. 19 is an isometric view of the embodiment shown in FIG. 18.

In one example embodiment, as illustrated in FIG.18, support structure 120 may comprise one or more bumpers, which may be part of or otherwise constructed on a base assembly 130 to provide the tangential support. Base assembly 130 and associated structures may also be seen in FIG. 19, which is an isometric view of the embodiment shown in FIG. 18. In this example embodiment, a cradle 110 may include a recess to receive superconducting winding 61. In one example embodiment, cradle 110 may include an arch-shaped exterior surface, which can receive the respective distal end 78 of an elongated loop. Cradle 110 may include one or more passageways 112 for passing a suitable cryogen fluid. It will be appreciated by one skilled in the art that aspects of the present invention are not limited to any specific arrangement in connection with passageways 112. For example, it is contemplated that cooling passageways could be constructed within winding 61. In one example embodiment, cradle 110 may include one or more weight-reducing openings 114. Cradle 110 may be made from aluminum, aluminum alloy, or other suitable relatively lightweight, fiber-reinforced composite material.

FIG. 18 further shows a pedestal support 116, which closes the bottom of the recess in cradle 110 and provides a pedestal to support superconducting winding 61. Pedestal 116 may be made from a thermoplastic polymer material or similar thermally-isolating material. Pedestal support 116 may further include an arch-shaped surface 118, which in one example embodiment may be supported by base assembly 130.

Bracket assembly 100 (e.g., FIG. 16), cradle 110 and pedestal support 116 are examples of respective assemblies which may be used to accommodate superconducting winding 61.

For example, during static conditions (no rotor rotation) or during rotational conditions comprising relatively low revolution per minute (RPM) rotation of the rotor (e.g., in a range from approximately 100 RPM to approximately 300 RPM), pedestal support 116 may be in contact with one or more seats 132, which may be constructed along at least one or more portions on a corresponding periphery 134 of base assembly 130. Conversely, during rotational conditions comprising relatively higher revolution per minute (RPM) rotation of the rotor (e.g., approximately exceeding the foregoing example range), in response to centrifugal forces, a relatively small gap (G) (e.g., in the order of a few millimeters) may be formed between surface 118 of pedestal support 116 and seats 132, and this gap may be effective to reduce conductive thermal transfer from the "warm" rotor core 54 to superconducting winding 61. Support structure 120 may be implemented in various ways. For example, support structure 120 may be implemented as a continuous bumper 121. This continuous structure would provide a dual functionality. For example, a first bumper portion 122 may provide a support function provided by seat 132 during the static conditions or relatively low-speed rotor operation, and a second bumper portion 124 would provide the tangential support, which otherwise would have been carried by the laterally-extending loops. In this example embodiment, second bumper portion 124 may be viewed as an extension of seat 132, and bumpers portions 122 and 124 would define periphery 134 of base assembly 130.

In one alternative embodiment, support structure 120 may be implemented as a discrete bumper structure along periphery 134. For example, one or more discrete bumpers 126 would provide the tangential support, which otherwise would have been carried by the laterally-extending loops. It will be appreciated that the laterally-extending loops described above may be broadly conceptualized as one example embodiment of support structure 120.

Base assembly 130 may be made from any of various materials, which may comprise a relatively wide range of thermal conductivity characteristics, such as steel, aluminum, aluminum alloy, fiber-reinforced composite material. In example cases where base assembly 130 is made from a material having a relatively high thermal conductivity, support structure 120 may optionally include a coating of an appropriate thermally-isolating material, or support structure 120 may be optionally made of a material having lower thermal conductivity relative to the thermal conductivity of base assembly 130. In other example cases, where base assembly 130 is made from a material already comprising a relatively low thermal conductivity (e.g., fiber-reinforced composite), further thermal isolation need not be used in connection with support structure 120.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus to support at least one superconductor winding in a spaced-apart relationship from a rotor core of an electromotive machine, the apparatus comprising:
    at least one elongated loop arranged to provide radial support to said at least one superconducting winding, the elongated loop comprising a material substantially resistant to heat flow;
    an axially-extending base assembly arranged to anchor said at least one loop with respect to the rotor core at a proximate end of the elongated loop; and
    an assembly having a recess to receive at least a portion of said at least one superconductor winding and to support the elongated loop at a distal end of the elongated loop.

2. The apparatus of claim 1, further comprising a support structure arranged to provide tangential support to said at least one superconducting winding.

3. The apparatus of claim 2, wherein the support structure comprises a laterally-extending loop arranged to provide the tangential support to said at least one superconducting winding, the laterally-extending loop comprising a material substantially resistant to heat flow.

4. The apparatus of claim 2, wherein the base assembly comprises a bumper support structure which constitutes the support structure.

5. The apparatus of claim 4, wherein the bumper support structure comprises at least one discrete bumper disposed on a periphery of the base assembly.

6. The apparatus of claim 4, wherein the bumper support structure comprises a first bumper portion which defines a seat arranged to support the cradle during a static condition of the rotor or during a rotational condition comprising a relatively low revolution per minute (RPM) of the rotor, and further comprises a second bumper portion which jointly with said at least first loop provide the radial and tangential support to the cradle.

7. The apparatus of claim 2, wherein the assembly comprises a cradle and a pedestal arranged to close a bottom side of the recess and support the superconducting winding in the cradle.

8. The apparatus of claim 7, wherein the base assembly comprises at least one seat arranged to support the pedestal during a static condition of the rotor or during a rotational condition comprising a relatively low revolution per minute (RPM) of the rotor.

9. The apparatus of claim 8, wherein the support structure comprises an extension of said at least one seat.

10. The apparatus of claim 9, wherein said at least one seat and the extension of said at least one seat form a continuous bumper support structure, which defines at least a portion of the periphery of the base assembly.

11. An apparatus to support a superconductor winding in a spaced apart relationship from a rotor core of an electromotive machine, comprising:
    an assembly configured to define a recess to receive the superconductor winding;
    at least one elongated loop arranged to provide radial support to the superconducting winding, the elongated loop comprising a material substantially resistant to heat flow, wherein the assembly is arranged to support the elongated loop at a distal end of the elongated loop;
    an axially-extending base assembly arranged to anchor the elongated loop with respect to the rotor core at a proximate end of the elongated loop; and
    a support structure to provide jointly with the elongated loop radial and tangential support to the assembly.

12. The apparatus of claim 11, wherein the support structure comprises a laterally-extending loop arranged to provide the tangential support to the superconducting winding, the laterally-extending loop comprising a material substantially resistant to heat flow.

13. The apparatus of claim 11, wherein the base assembly comprises a bumper support structure which constitutes the support structure.

14. The apparatus of claim 13, wherein the bumper support structure comprises at least one discrete bumper disposed on a periphery of the base assembly.

15. The apparatus of claim 13, wherein the bumper support structure comprises a first bumper portion which defines a seat arranged to support the cradle during a static condition of the rotor or during a rotational condition comprising a relatively low revolution per minute (RPM) of the rotor, and further comprises a second bumper portion which jointly with said at least first loop provide the radial and tangential support to the cradle.

16. The apparatus of claim 11, wherein the assembly comprises a cradle and a pedestal arranged to close a bottom side of the recess and support the superconducting winding in the cradle.

17. The apparatus of claim 16, wherein the base assembly comprises at least one seat arranged to support the pedestal during a static condition of the rotor or during a rotational condition comprising a relatively low revolution per minute (RPM) of the rotor.

18. The apparatus of claim 17, wherein the support structure comprises an extension of said at least one seat.

19. The apparatus of claim 18, wherein said at least one seat and the extension of said at least one seat form a continuous bumper support structure, which defines at least a portion of the periphery of the base assembly.

* * * * *